US012443159B2

(12) United States Patent
Fujimura et al.

(10) Patent No.: US 12,443,159 B2
(45) Date of Patent: Oct. 14, 2025

(54) SUPPORT DEVICE MONITORING FUNCTION BLOCKS OF USER PROGRAM, NON-TRANSITORY STORAGE MEDIUM STORING SUPPORT PROGRAM THEREON, AND CONTROL SYSTEM

(71) Applicant: OMRON CORPORATION, Kyoto (JP)

(72) Inventors: Ryosuke Fujimura, Kyoto (JP); Hiromu Suganuma, Kyoto (JP); Hiroko Kubo, Kyoto (JP); Asahi Matsui, Kyoto (JP)

(73) Assignee: OMRON CORPORATION, Kyoto (JP)

( * ) Notice: Subject to any disclaimer, the term of this patent is extended or adjusted under 35 U.S.C. 154(b) by 411 days.

(21) Appl. No.: 17/874,819

(22) Filed: Jul. 27, 2022

(65) Prior Publication Data
US 2023/0055189 A1 Feb. 23, 2023

(30) Foreign Application Priority Data

Aug. 17, 2021 (JP) .................................. 2021-132645

(51) Int. Cl.
*G05B 19/05* (2006.01)
*G06F 11/32* (2006.01)
(52) U.S. Cl.
CPC ......... *G05B 19/058* (2013.01); *G05B 19/054* (2013.01); *G06F 11/321* (2013.01)
(58) Field of Classification Search
CPC .... G05B 19/058; G05B 19/054; G06F 11/321
See application file for complete search history.

(56) References Cited

U.S. PATENT DOCUMENTS 6,577,323 B1 * 6/2003 Jamieson ........... G05B 23/0232
715/965
7,895,575 B2 * 2/2011 Yoon ....................... H04L 41/22
717/124

(Continued)

FOREIGN PATENT DOCUMENTS

CN 112689805 A 4/2021
EP 2 972 625 A2 1/2016

(Continued)

OTHER PUBLICATIONS

PLCopen-Technical Committee 5-Safety Software Technical Specification Part 1:Concepts and Function Blocks Version 2.01—Official Release, Feb. 25, 2020.

(Continued)

*Primary Examiner* — Ashish Thomas
*Assistant Examiner* — Indranil Chowdhury
(74) *Attorney, Agent, or Firm* — Sughrue Mion, PLLC

(57) ABSTRACT

A support device includes an interface configured to establish connection to a controller, the controller being configured to execute a user program including a function block, a storage unit configured to store a monitoring condition in which a data type of the function block and a name of a monitoring target variable are defined with the data type and the name associated with each other, and a search module configured to search for, among instances of function blocks created for the controller to execute the user program, an instance having a data type matching a data type defined in the monitoring condition and having a value of a monitoring target variable associated with the matching data type indicating a monitoring target event.

20 Claims, 16 Drawing Sheets

(56) References Cited

U.S. PATENT DOCUMENTS

| | | | |
|---|---|---|---|
| 8,108,790 B2* | 1/2012 | Morrison, Jr. | G05B 23/0272 |
| | | | 715/965 |
| 8,710,976 B2* | 4/2014 | Zheng | G05B 23/0254 |
| | | | 340/3.1 |
| 2007/0061641 A1* | 3/2007 | Yoon | H04L 41/145 |
| | | | 714/724 |
| 2007/0135944 A1* | 6/2007 | Schmid | G05B 23/0272 |
| | | | 700/83 |
| 2007/0239291 A1* | 10/2007 | Wayland | G05B 23/0272 |
| | | | 700/83 |
| 2008/0114474 A1* | 5/2008 | Campbell | G05B 19/4183 |
| | | | 700/89 |
| 2010/0017743 A1* | 1/2010 | Swanston | G06F 3/0481 |
| | | | 715/781 |
| 2011/0054643 A1* | 3/2011 | Law | G06F 11/3636 |
| | | | 700/83 |
| 2014/0310248 A1* | 10/2014 | Gokita | G06F 16/13 |
| | | | 707/687 |
| 2015/0286560 A1* | 10/2015 | Michelsen | G06F 11/3684 |
| | | | 717/124 |
| 2017/0262357 A1* | 9/2017 | Fujimura | G06F 11/3612 |
| 2017/0315521 A1* | 11/2017 | Hagendorf | G05B 17/02 |
| 2018/0165182 A1* | 6/2018 | Yoshida | G06F 11/3644 |
| 2020/0125060 A1* | 4/2020 | Fujimura | G05B 19/056 |
| 2020/0125061 A1* | 4/2020 | Miyasaka | G05B 19/058 |
| 2022/0011735 A1 | 1/2022 | Tahara | |
| 2022/0342380 A1* | 10/2022 | Fujimura | G05B 19/058 |
| 2024/0329615 A1* | 10/2024 | Nawata | G06F 8/51 |
| 2024/0338293 A1* | 10/2024 | Jin | G06F 11/3698 |

FOREIGN PATENT DOCUMENTS

| | | | | |
|---|---|---|---|---|
| EP | 3 220 220 A1 | 9/2017 | | |
| EP | 3 220 220 B1 | 11/2020 | | |
| EP | 2 972 625 B1 | 5/2021 | | |
| EP | 3869287 A1 * | 8/2021 | | G05B 23/0216 |
| JP | 2011-175353 A | 9/2011 | | |
| JP | 2017-167652 A | 9/2017 | | |
| JP | 2021-60675 A | 4/2021 | | |
| WO | WO-0102919 A1 * | 1/2001 | | G05B 23/0232 |
| WO | WO-2009105889 A1 * | 9/2009 | | G05B 23/0256 |
| WO | WO-2014151559 A2 * | 9/2014 | | G05B 23/0216 |
| WO | WO-2021065032 A1 * | 4/2021 | | G05B 19/054 |

OTHER PUBLICATIONS

Extended European Search Report dated Jan. 27, 2023 from the European Patent Office in EP Application No. 22187637.8.
Communication dated Jan. 21, 2025 in Japanese Application No. 2021-132645.
Chinese Office Action dated Apr. 9, 2025 in Application No. 202210839373.2.

* cited by examiner

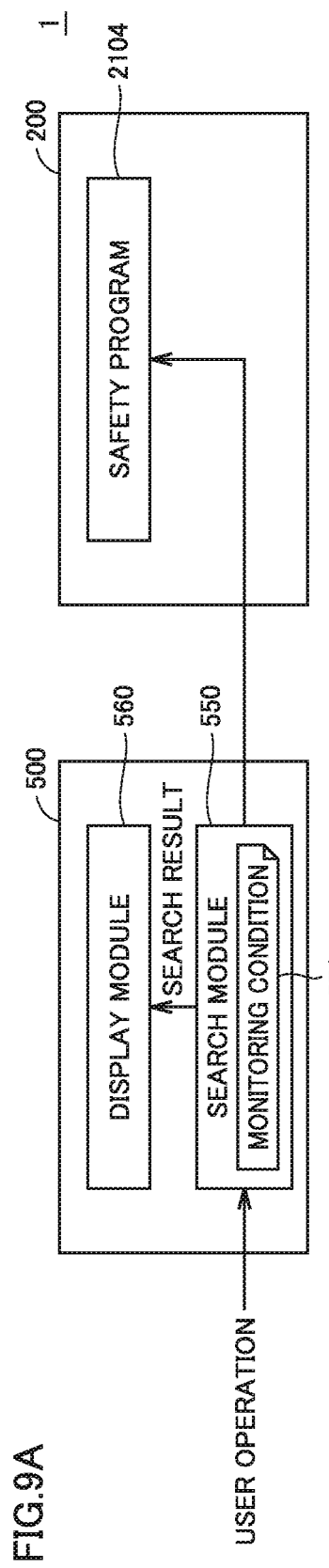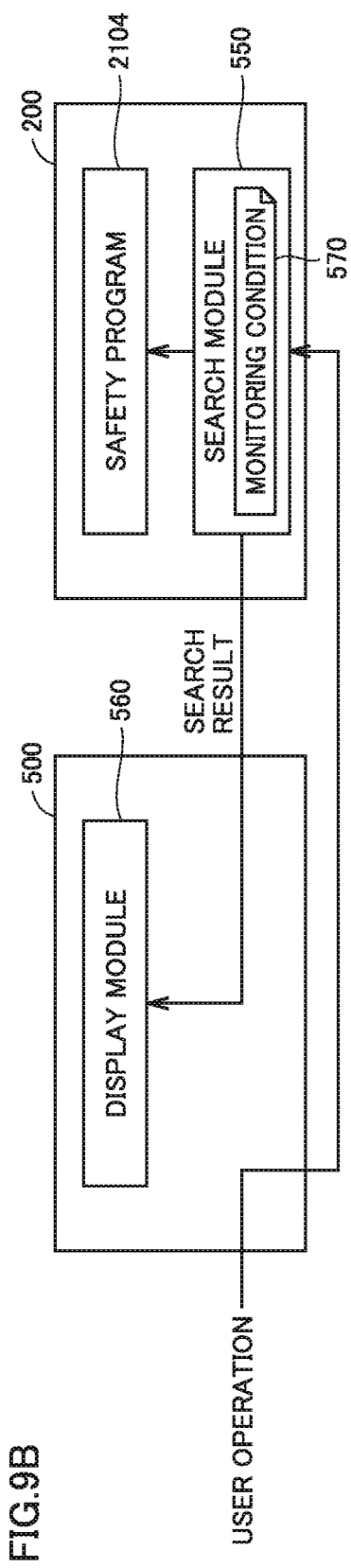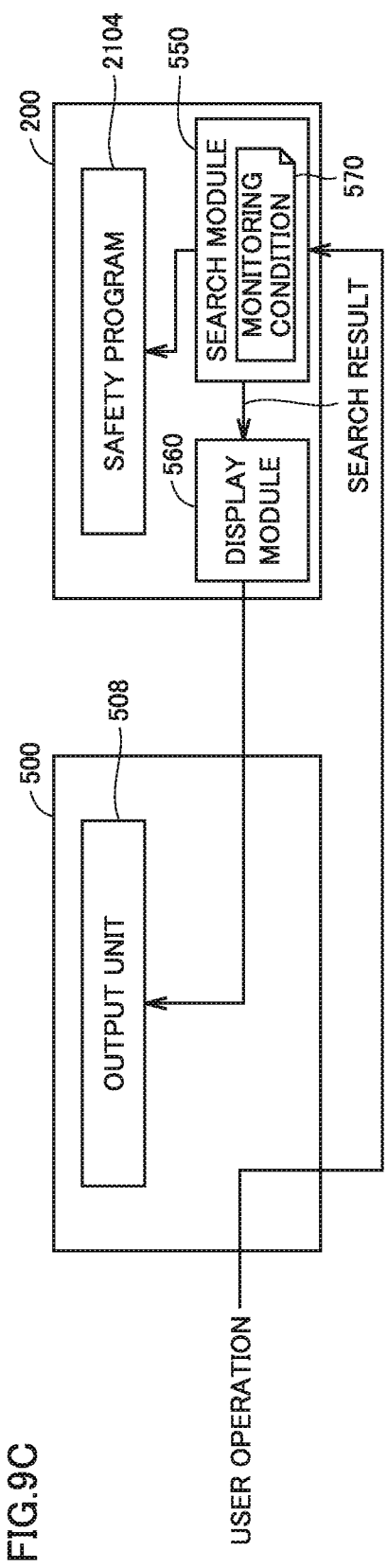

FIG.12

DEFINITION OF FB FOR MONITORING EVENTS — 570

Sofety Function Blocks — 571

| Active | Priority | Data Type | Signal | Value |
|---|---|---|---|---|
| ☑ | 10 | SF_Antivalent | Error | TRUE |
| ☑ | 20 | SF_EDM | Error | TRUE |
| ☐ | 30 | SF_EmergencyStop | Error | TRUE |
| ☑ | 40 | SF_Equivalent | Error | TRUE |
| ☑ | 50 | SF_ESPE | Error | TRUE |
| ☑ | 60 | SF_GuardLocking | Error | TRUE |

User-Defined Function Blocks — 572

| Active | Priority | Data Type | Signal | Value |
|---|---|---|---|---|
| ☑ | 0 | SafetyCommon | ErrorFlag | TRUE |
| ☑ | 1 | Zone_Common | Abort | TRUE |
| ☑ | 2 | SLC_Gate | Error | TRUE |
| ☑ | 3 | EnableControl | Error | TRUE |
|  |  |  |  |  |
|  |  |  |  |  |

| No | DATA TYPE OF FUNCTION BLOCK | OUTPUT VARIABLE USED FOR MONITORING OCCURRENCE OF ERROR | OUTPUT VARIABLE USED FOR MONITORING OUTPUT-OFF |
|---|---|---|---|
| 1 | SF_ResetButton | Error | (NOT MONITORING TARGET BECAUSE FB DOES NOT HANDLE TARGET SIGNAL) |
| 2 | SF_Equivalent | Error | S_EquivalentOut |
| 3 | SF_Antivalent | Error | S_AntivalentOut |
| 4 | SF_ModeSelector | Error | S_AnyModeSel |
| 5 | SF_EmergencyStop | Error | S_EStopOut |
| 6 | SF_ESPE | Error | S_ESPE_Out |
| 7 | SF_PSE | Error | S_PSE_Out |
| 8 | SF_TwoHandControlTypeII | Error | S_TwoHandOut |
| 9 | SF_TwoHandControlTypeIII | Error | S_TwoHandOut |
| 10 | SF_TestableSafetySensor | Error | S_OSSD_Out |
| 11 | SF_MutingSeq | Error | S_AOPD_Out |
| 12 | SF_MutingPar | Error | S_AOPD_Out |
| 13 | SF_MutingPar_2Sensor | Error | S_AOPD_Out |
| 14 | SF_EnableSwitch | Error | S_EnableSwitchOut |
| 15 | SF_EnableSwitch_2 | Error | S_EnableSwitchOut |
| 16 | SF_Guard | Error | S_GuardOut |
| 17 | SF_GuardLocking_2 | Error | S_GuardLocked |
| 18 | SF_GuardLockingSerial | Error | S_GuardLocked |
| 19 | SF_Override | Error | S_AOPD_OUT |
| 20 | SF_SafetyRequest | Error | S_SafetyRequest |
| 21 | SF_OutControl | Error | S_OutControl |
| 22 | SF_EDM | Error | S_EDM_Out |

SEARCH FOR FB IN/WHICH ERROR HAS OCCURRED

| Program | Data Type | Instance Name | DiagCode | Status | Details |
|---|---|---|---|---|---|
| SafetyControl_Local | SF_GuardMonitoring | SF_GuardMonitoring_0 | 49169(0xC011) | TIME INCONSISTENCY ERROR 1 | ... |
| SafetyControl_Local | SF_EDM | SF_EDM_0 | 49296(0xC090) | EDM ERROR 33 | ... |
| SafetyControl_Local | SF_EDM | SF_EDM_1 | 49296(0xC090) | EDM ERROR 33 | ... |
| SafetyControl_Netw | SF_EDM | SF_EDM_0 | 49248(0xC060) | EDM ERROR 23 | ... |
| SafetyControl_Netw | SF_EDM | SF_EDM_1 | 49248(0xC060) | EDM ERROR 23 | ... |
| Safety_Zone1 | Zone_Common | Zone_Common_0 | 49153(0xC001) | - | |
| Safety_Zone1 | SF_EDM | OutputCheck_0.SF_EDM_0 | 49248(0xC060) | EDM ERROR 23 | ... |
| Safety_Zone2 | Zone_Common | Zone_Common_0 | 9999(0x270F) | - | |

[ Update ]   [ Close ]   Safety Signature:#F6A5

SEARCH FOR FB WHOSE OUTPUT IS OFF

| Program | Data Type | Instance Name | DiagCode | Status | Details |
|---|---|---|---|---|---|
| SafetyControl_Local | SF_GuardMonitoring | SF_GuardMonitoring_0 | 32786(0x8012) | GUARD OPENED | ... |
| SafetyControl_Local | SF_EDM | SF_EDM_0 | 32784(0x8010) | OUTPUT DISABLED | ... |
| SafetyControl_Local | SF_EDM | SF_EDM_1 | 32784(0x8010) | OUTPUT DISABLED | ... |
| SafetyControl_Netw | SF_EDM | SF_EDM_0 | 49248(0xC060) | EDM ERROR 23 | ... |
| SafetyControl_Netw | SF_EDM | SF_EDM_1 | 49248(0xC060) | EDM ERROR 23 | |
| Safety_Zone1 | Zone_Common | Zone_Common_0 | 49153(0xC001) | - | |
| Safety_Zone1 | SF_EDM | OutputCheck_0.SF_EDM_0 | 49296(0xC090) | EDM ERROR 33 | ... |
| Safety_Zone2 | Zone_Common | Zone_Common_0 | 32769(0x8001) | - | |

[ Update ]   [ Close ]   Safety Signature:#F6A5

SUPPORT DEVICE MONITORING FUNCTION BLOCKS OF USER PROGRAM, NON-TRANSITORY STORAGE MEDIUM STORING SUPPORT PROGRAM THEREON, AND CONTROL SYSTEM

BACKGROUND OF THE INVENTION

Field of the Invention

The present invention relates to a control system, a support device, and a support program.

Description of the Background Art

A programmable logic controller (PLC) executes a control operation in accordance with a user program created to adapt to a control target. Such a user program executed on the PLC is also being standardized. More specifically, IEC61131-3, which is an international standard, defines PLC standard programming.

Further, safety controllers for ensuring functional safety at manufacturing sites are widely used. For such a safety controller, for example, a function block that handles a safety signal and a state transition of the function block are defined in a standard manner (see "PLCopen-Technical Committee 5—Safety, Software Technical Specification Part 1: Concepts and Function Blocks Version 2.01—Official Release", Feb. 25, 2020, or the like).

When an abnormality occurs in a running user program or output is off in a PLC or a safety controller, it is necessary to identify a factor of the abnormality by checking instructions constituting the user program and variables referred to by the instructions. The operation of identifying such a factor, however, requires experience and knowledge.

There is a demand for a mechanism that assists even a user with little experience and knowledge in identifying a factor of an abnormality that has occurred in a running user program.

SUMMARY OF THE INVENTION

A support device according to an embodiment includes an interface configured to establish connection to a controller, the controller being configured to execute a user program including a function block, a storage unit configured to store a monitoring condition in which a data type of a function block and a name of a monitoring target variable are defined with the data type and the name associated with each other, and a search module configured to search for, among one or more instances of one or more function blocks created for the controller to execute the user program, an instance having a data type matching a data type defined in the monitoring condition and having a value of a monitoring target variable associated with the matching data type indicating a monitoring target event.

According to this configuration, evaluating the value of the name of the monitoring target variable designated for each data type in accordance with the monitoring condition makes it possible to identify a monitoring target instance from the instances of the function block created for executing the user program.

The support device may include a display unit configured to display a list of one or more instances retrieved by the search module. According to this configuration, a user can check the list of the retrieved instances.

The display unit may display a portion of the user program in which a function block corresponding to an instance selected from among the retrieved instances exists. According to this configuration, the user can easily check, by selecting any instance from among the retrieved instances, a corresponding portion of the user program.

The display unit may display at least one of a diagnostic code output from each of the retrieved instances and a status name of a state transition diagram indicated by the diagnostic code. According to this configuration, the user can check the status of each of the retrieved instances in more detail.

A value indicating the monitoring target event associated with the name of the monitoring target variable is predetermined with the value and the monitoring condition associated with each other. According to this configuration, selecting the monitoring condition allows the value indicating the monitoring target event to be automatically determined.

The monitoring condition may include a priority for each data type. The display unit may display the retrieved instances in the order based on the priority defined in the monitoring condition. According to this configuration, for example, it is possible to easily check, one by one, an instance of a data type for which it is highly necessary to take a measure.

The monitoring condition may include a value indicating the monitoring target event associated with the name of the monitoring target variable. According to this configuration, a value associated with a variable name can be set as desired in accordance with the monitoring target event.

The monitoring condition may include at least one of a condition used for monitoring an occurrence of an error in a function block and a condition used for monitoring a function block whose output is off. According to this configuration, it is possible to easily search for a function block in which an error has occurred and/or a function block whose output is off.

The user program may be a safety program. According to this configuration, search processing suitable for the safety program written using a function block can be implemented.

A non-transitory storage medium stores a support program for implementing a support device according to another embodiment, the support program causing a computer to perform reading a monitoring condition in which a data type of a function block and a name of a monitoring target variable are defined with the data type and the name associated with each other, establishing connection to a controller configured to execute a user program including a function block, and searching for, among one or more instances of one or more function blocks created for the controller to execute the user program, an instance having a data type matching a data type defined in the monitoring condition and having a value of a monitoring target variable associated with the matching data type indicating a monitoring target event.

A control system according to still another embodiment includes a controller configured to execute a user program including a function block, a storage unit configured to store a monitoring condition in which a data type of a function block and a name of a monitoring target variable are defined with the data type and the name associated with each other, and a search module configured to search for, among one or more instances of one or more function blocks created for the controller to execute the user program, an instance having a data type matching a data type defined in the monitoring condition and having a value of a monitoring target variable associated with the matching data type indicating a monitoring target event.

The foregoing and other objects, features, aspects and advantages of the present invention will become more apparent from the following detailed description of the present invention when taken in conjunction with the accompanying drawings.

BRIEF DESCRIPTION OF THE DRAWINGS

FIGS. 9A to 9C are diagrams schematically illustrating a configuration for implementing processing related to instance search of the control system according to the present embodiment.

FIG. 12 is a diagram schematically illustrating an example of a common monitoring condition used in the control system according to the present embodiment.

FIG. 13 is a diagram schematically illustrating an example of a standard function block definition in the control system according to the present embodiment.

FIGS. 15A and 15B are diagrams schematically illustrating another example of the search result from the control system according to the present embodiment.

DESCRIPTION OF THE PREFERRED EMBODIMENTS

Figure 1:
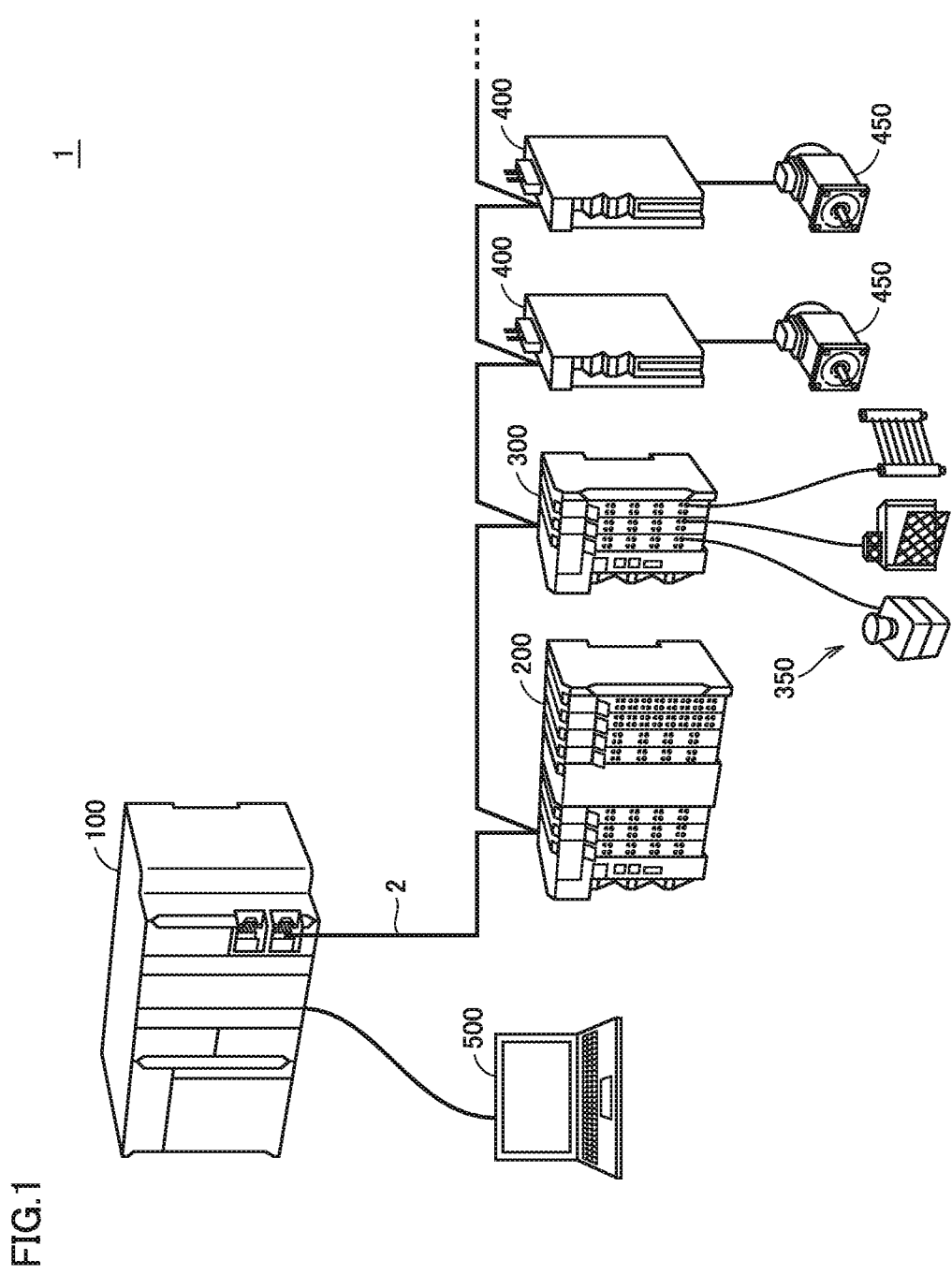
FIG. 1 is a diagram schematically illustrating an example of a configuration of a control system according to the present embodiment.

Embodiments of the present technology will be described in detail with reference to the drawings. Note that the same or corresponding parts in the drawings are denoted by the same reference numerals, and no redundant description will be given of such parts.

A. Application Example

First, an example of a case to which the present invention is applied will be described. FIG. 1 is a diagram schematically illustrating an example of a configuration of a control system 1 according to the present embodiment. With reference to FIG. 1, control system 1 includes a standard controller 100. Standard controller 100 is connected to a safety controller 200, a safety slave coupler 300, and a safety driver 400 over a field network 2. EtherCAT (registered trademark) may be used as an example of the protocol used on field network 2.

Standard controller 100 executes standard control on a desired control target in accordance with a standard control program created in advance. Safety controller 200 executes, separately from standard controller 100, safety control on a desired control target in accordance with a safety program created in advance.

Herein, the "standard control" is a generic name for processing of controlling the control target in accordance with a predetermined required specification. On the other hand, the "safety control" is a generic name for processing of preventing the safety of a person from being threatened by a facility, a machine, or the like. The "safety control" is designed to satisfy requirements for implementing the safety function defined by IEC61508 or the like.

Herein, the standard control program created as desired to implement the standard control and the safety program created as desired to implement the safety control may be collectively referred to as a "user program". Further, standard controller 100 and safety controller 200 may be collectively referred to as a "controller" herein. Therefore, both standard controller 100 and safety controller 200 are examples of the controller that executes the user program. The user program includes a function block as described later.

Safety slave coupler 300 is capable of transferring an input signal received from a desired safety device 350 to safety controller 200 and/or transferring a command from safety controller 200 to a desired safety device 350. Note that safety device 350 may be directly connected to safety controller 200.

Safety driver 400 drives servomotor 450 electrically connected to safety driver 400. Safety driver 400 also has a safety function related to driving of servomotor 450.

A support device 500 is connectable to standard controller 100. Support device 500 provides an environment in which the user program (a standard control program 1104 and/or a safety program 2104) executed on the controller (standard controller 100 and/or safety controller 200) is developed. Support device 500 may provide a function of monitoring a program runtime state in control system 1 in addition to creating or modifying the program executed on standard controller 100 and/or safety controller 200.

Note that a display device (not illustrated) may be connectable to standard controller 100. The display device is also referred to as a human machine interface (HMI) or a programmable terminal (PT), and the display device provides a monitoring operation screen by referring to information held by the controller (standard controller 100 and/or safety controller 200) and sends a command corresponding to a user operation to standard controller 100.

B. Example of Configuration of Device Included in Control System 1

Next, an example of a configuration of each device included in control system 1 will be described.

b1: Standard Controller 100

Figure 2:
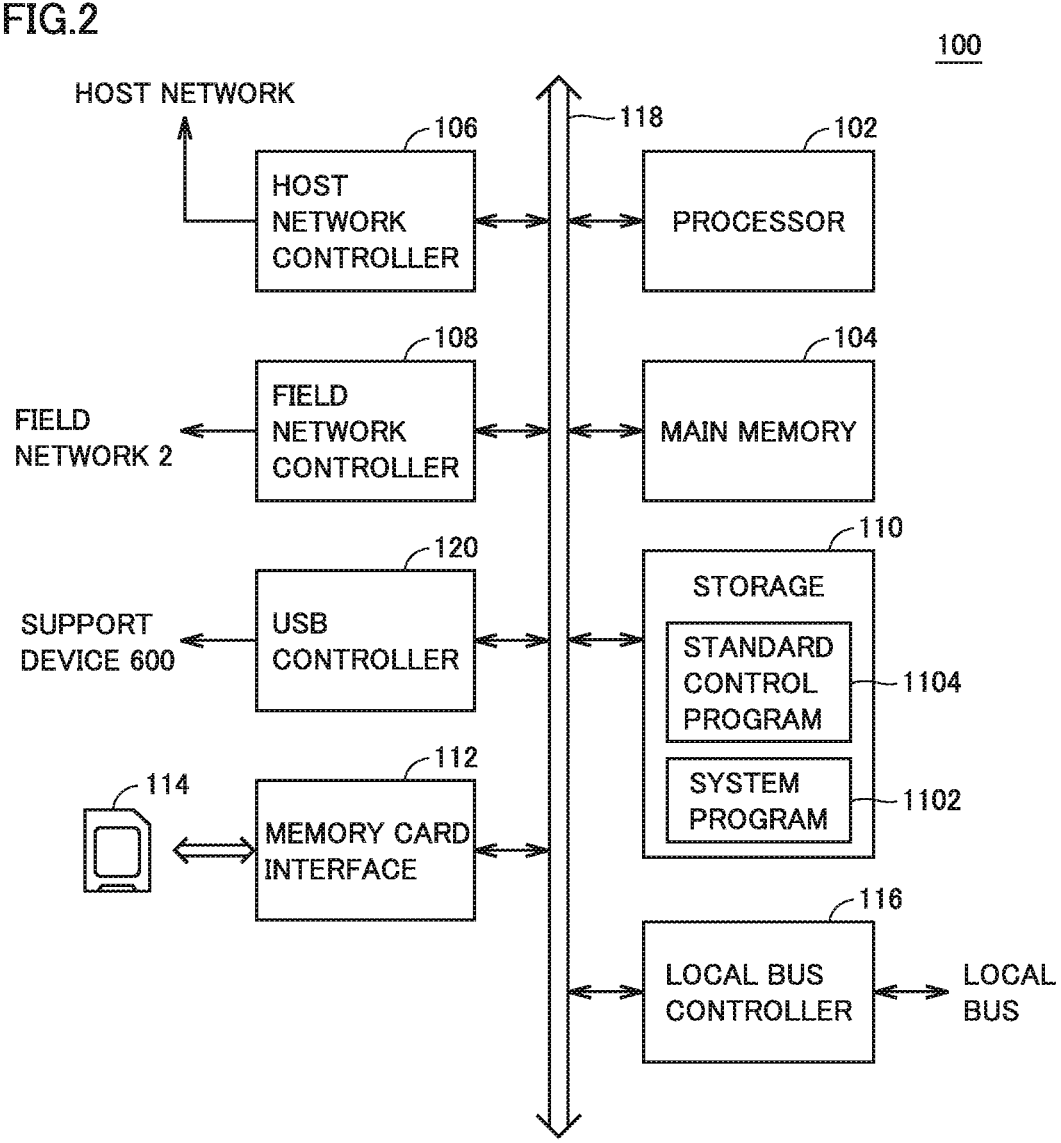
FIG. 2 is a diagram schematically illustrating an example of a hardware configuration of a standard controller that is a part of the control system according to the present embodiment.

FIG. 2 is a diagram schematically illustrating an example of a hardware configuration of standard controller 100 that is a part of control system 1 according to the present embodiment. With reference to FIG. 2, standard controller 100 includes a processor 102, a main memory 104, a storage 110, a host network controller 106, a field network controller 108, a universal serial bus (USB) controller 120, a memory card interface 112, and a local bus controller 116. Such components are connected over a processor bus 118.

Processor 102 primarily serves as an operation processor that executes a control operation related to the standard control, and includes a central processing unit (CPU), a graphics processing unit (GPU), or the like. Specifically, processor 102 reads a program (for example, a system program 1102 and standard control program 1104) stored in storage 110, loads the program into main memory 104, and executes the program, thereby enabling the control operation and various processing as described later to be executed in a manner that depends on the control target.

Main memory 104 includes a volatile storage device such as a dynamic random access memory (DRAM) or a static random access memory (SRAM). Storage 110 includes, for example, a non-volatile storage device such as a solid state drive (SSD) or a hard disk drive (HDD).

Storage 110 stores system program 1102 for implementing a basic function, and standard control program 1104 created to adapt to the control target.

Host network controller 106 exchanges data with a desired information processor over a host network.

Field network controller 108 exchanges data with a desired device over field network 2. In the configuration illustrated in FIG. 2, field network controller 108 serves as a communication master of field network 2.

USB controller 120 exchanges data with support device 500 or the like over a USB connection.

Memory card interface 112 receives a memory card 114 that is an example of a removable storage medium. Memory card interface 112 can read and write desired data from and to memory card 114.

Local bus controller 116 exchanges data with a desired unit connected to standard controller 100 over a local bus.

b2: Safety Controller 200

Figure 3:
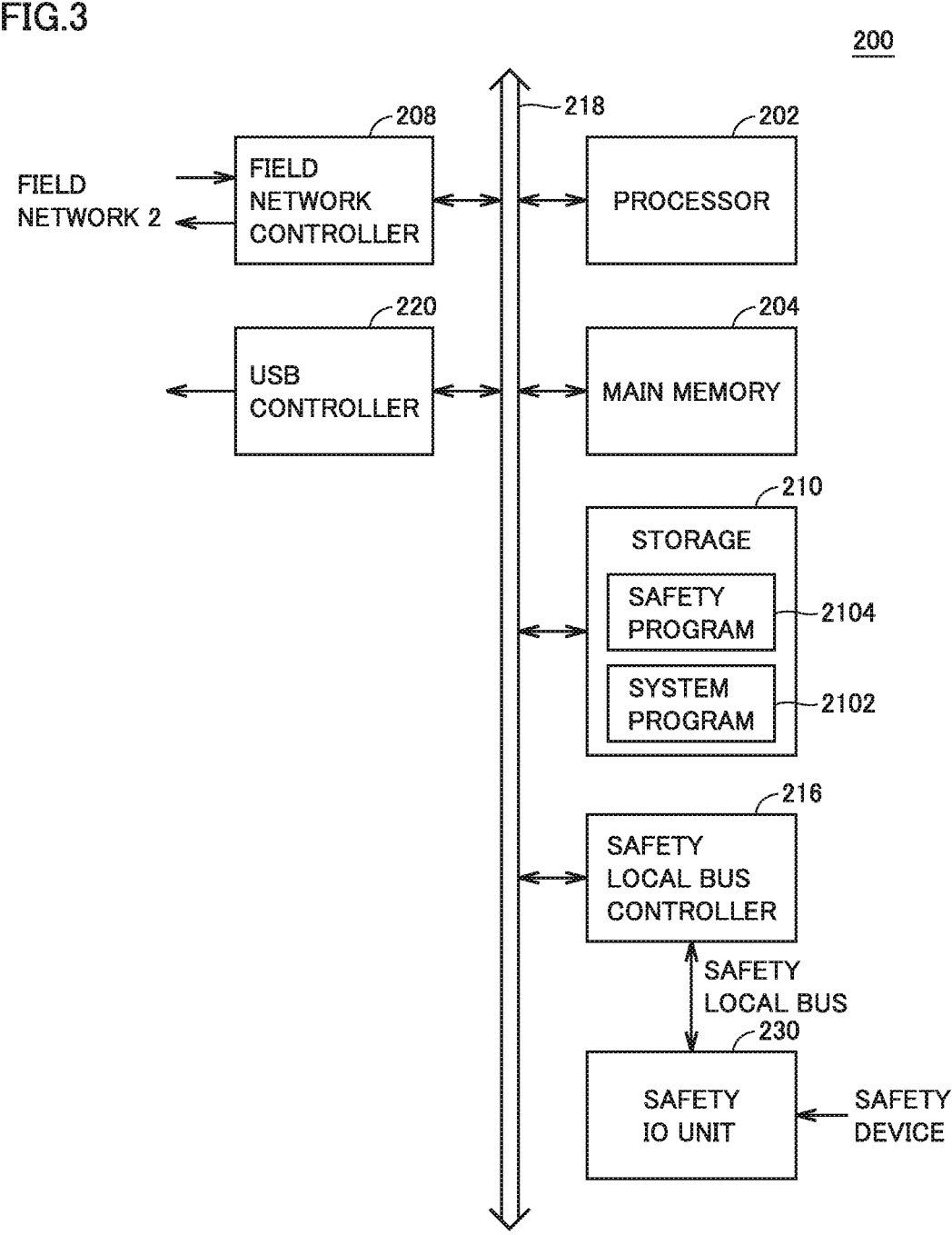
FIG. 3 is a diagram schematically illustrating an example of a hardware configuration of a safety controller that is a part of the control system according to the present embodiment.

FIG. 3 is a diagram schematically illustrating an example of a hardware configuration of safety controller 200 that is a part of control system 1 according to the present embodiment. With reference to FIG. 3, safety controller 200 includes a processor 202, a main memory 204, a storage 210, a field network controller 208, a USB controller 220, and a safety local bus controller 216. Such components are connected over a processor bus 218.

Processor 202 primarily serves as an operation processor that executes a control operation related to the safety control, and includes a CPU, a GPU, or the like.

Main memory 204 includes a volatile storage device such as a DRAM or an SRAM. Storage 210 includes, for example, a non-volatile storage device such as an SSD or an HDD.

Storage 210 stores a system program 2102 for implementing a basic function, and safety program 2104 created to adapt to a required safety function.

Field network controller 208 exchanges data with a desired device over field network 2.

USB controller 220 exchanges data with support device 500 or the like over a USB connection.

Safety local bus controller 216 exchanges data with a desired safety IO unit 230 connected to safety controller 200 over a safety local bus.

b3: Safety Slave Coupler 300

Figure 4:
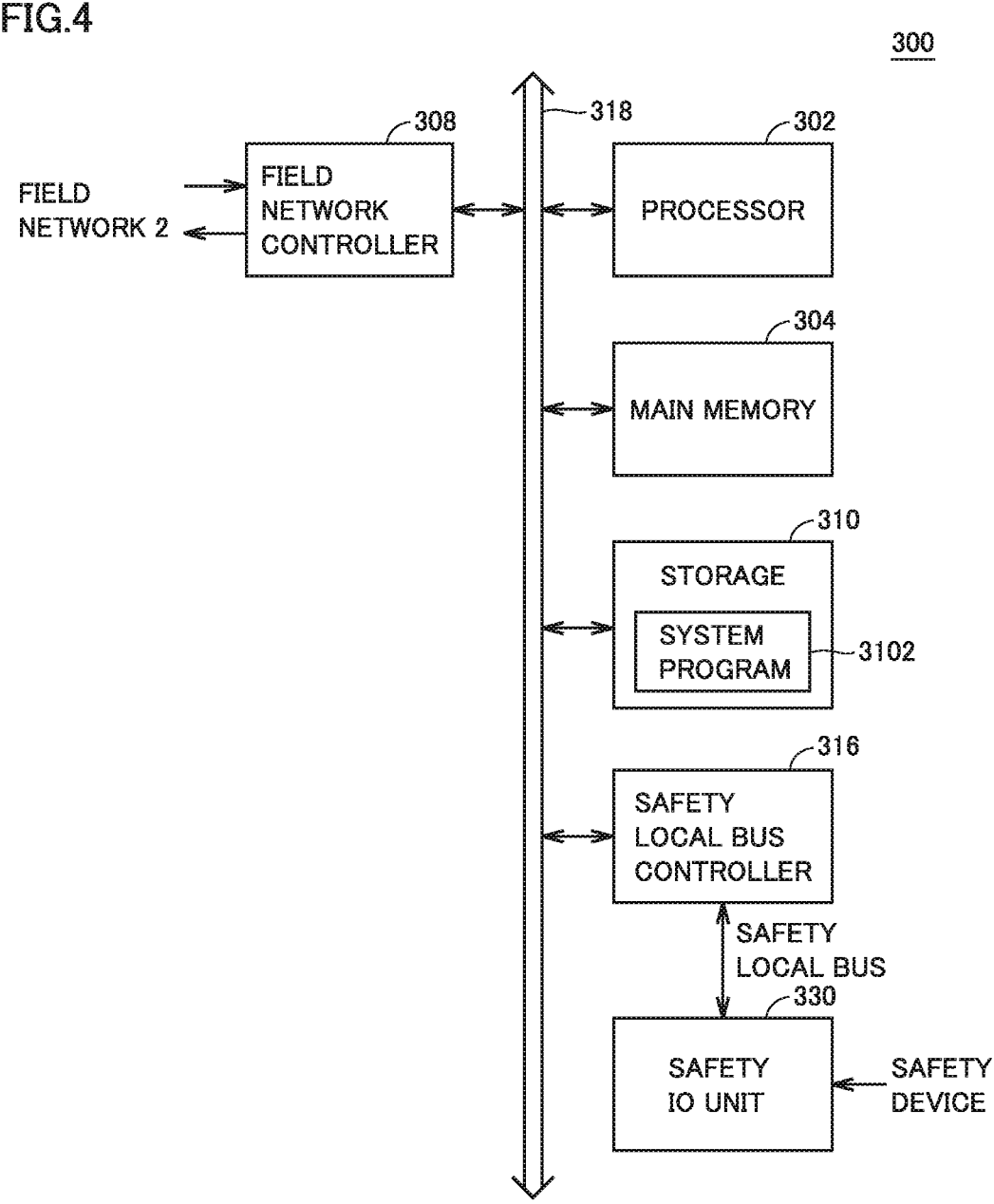
FIG. 4 is a diagram schematically illustrating an example of a hardware configuration of a safety slave coupler that is a part of the control system according to the present embodiment.

FIG. 4 is a diagram schematically illustrating an example of a hardware configuration of safety slave coupler 300 that is a part of control system 1 according to the present embodiment. With reference to FIG. 4, safety slave coupler 300 includes a processor 302, a main memory 304, a storage 310, a field network controller 308, and a safety local bus controller 316. Such components are connected over a processor bus 318.

Processor 302 primarily serves as an operation processor that executes a control operation to operate safety slave coupler 300, and includes a CPU, a GPU, or the like.

Main memory 304 includes a volatile storage device such as a DRAM or an SRAM. Storage 310 includes, for example, a non-volatile storage device such as an SSD or an HDD.

Storage 310 stores a system program 3102 for implementing a basic function.

Field network controller 308 exchanges data with a desired device over field network 2. In the configuration illustrated in FIG. 4, field network controller 308 serves as a communication slave of field network 2.

Safety local bus controller 316 exchanges data with a desired safety IO unit 330 connected to safety slave coupler 300 over a safety local bus.

b4: Safety Driver 400 and Servomotor 450

Figure 5:
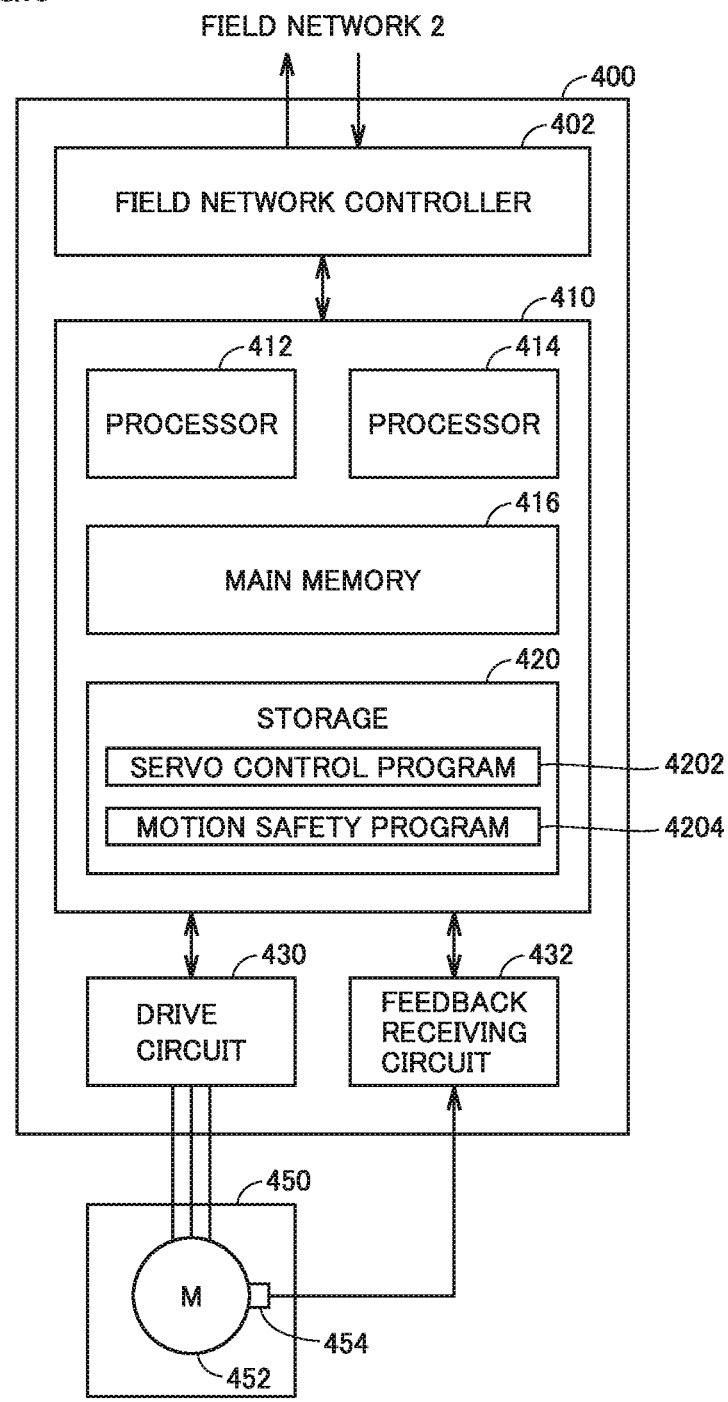
FIG. 5 is a diagram schematically illustrating examples of hardware configurations of a safety driver and a servomotor that are parts of the control system according to the present embodiment.

FIG. 5 is a diagram schematically illustrating examples of hardware configurations of safety driver 400 and servomotor 450 that are parts of control system 1 according to the present embodiment. With reference to FIG. 5, safety driver 400 includes a field network controller 402, a control unit 410, a drive circuit 430, and a feedback receiving circuit 432.

Control unit 410 executes operation processing necessary for the operation of safety driver 400. As an example, control unit 410 includes processors 412, 414, a main memory 416, and a storage 420. Processor 412 primarily executes a control operation for driving servomotor 450, and processor 414 primarily executes a control operation for providing the safety function related to servomotor 450. Processors 412, 414 each include a CPU or the like. The configuration is not limited to the configuration illustrated in FIG. 5, and may be a configuration including a single processor.

Main memory 416 includes a volatile storage device such as a DRAM or an SRAM. Storage 420 includes, for example, a non-volatile storage device such as an SSD or an HDD.

Storage 420 stores a servo control program 4202 for implementing servo control and a motion safety program 4204 for implementing a motion safety function.

Drive circuit 430 includes a converter circuit, an inverter circuit, and the like, and generates power having a designated voltage, current, and phase and supplies the power to servomotor 450 in accordance with a command from control unit 410.

Feedback receiving circuit 432 receives a feedback signal from servomotor 450 and outputs the reception result to control unit 410.

Servomotor 450 typically includes a three-phase AC motor 452 and an encoder 454 attached to a rotation shaft of three-phase AC motor 452.

b5: Support Device 500

Figure 6:
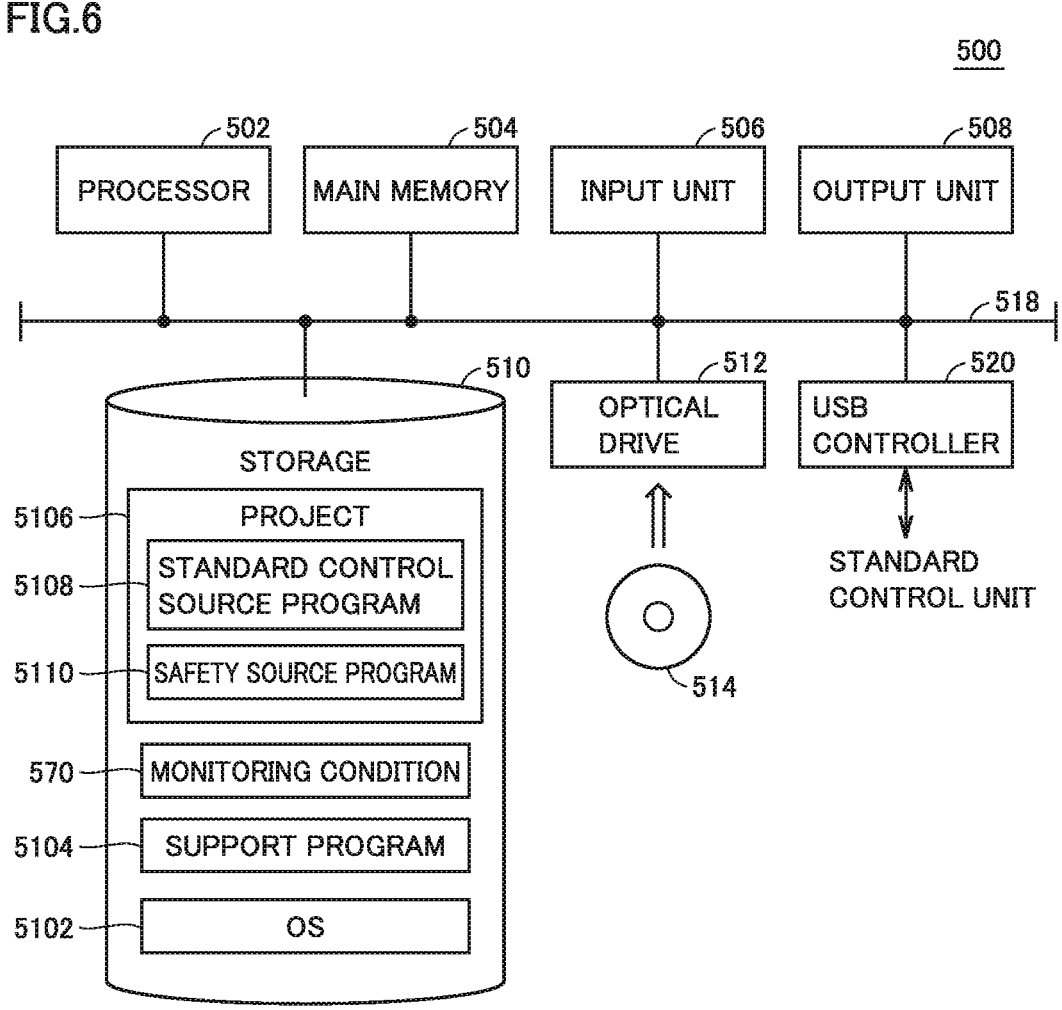
FIG. 6 is a diagram schematically illustrating an example of a hardware configuration of a support device that is a part of the control system according to the present embodiment.

FIG. 6 is a diagram schematically illustrating an example of a hardware configuration of support device 500 that is a part of control system 1 according to the present embodiment. As an example, support device 500 is implemented by hardware (for example, a general-purpose personal computer) adhering to a standard architecture.

With reference to FIG. 6, support device 500 includes a processor 502, a main memory 504, an input unit 506, an output unit 508, a storage 510, an optical drive 512, and a USB controller 520. Such components are connected over a processor bus 518.

Processor 502 includes a CPU, a GPU, or the like, and reads a program (for example, an OS 5102 and a support program 5104) stored in storage 510, loads the program into main memory 504, and executes the program, thereby enabling various processing as described later to be executed.

Main memory 504 includes a volatile storage device such as a DRAM or an SRAM. Storage 510 includes, for example, a non-volatile storage device such as an HDD or an SSD.

Storage 510 stores OS 5102 for implementing a basic function, support program 5104 for providing a function as support device 500, project data 5106 created by a user in a development environment, and a monitoring condition 570 used for search processing to be described later. Storage 510 is an example of a storage unit that stores monitoring condition 570.

Support device 500 provides a development environment in which creation of a program to be executed on each device included in control system 1 can be made in an integrated manner. Support device 500 is implemented substantially by support program 5104. Project data 5106 includes data generated in such an integrated development environment. Typically, project data 5106 includes a standard control source program 5108 and a safety source program 5110.

Standard control source program 5108 is converted into an object code, transmitted to standard controller 100, and stored as standard control program 1104 (see FIG. 2).

Safety source program 5110 is converted into an object code, transmitted to safety controller 200, and stored as safety program 2104 (see FIG. 3).

Input unit 506 includes a keyboard, a mouse, or the like, and receives a user operation. Output unit 508 includes a display, various indicators, a printer, or the like, and outputs a processing result and the like received from processor 502.

USB controller 520 is an example of an interface for establishing connection to the controller that executes the user program, and exchanges data with standard controller 100 or the like over a USB connection.

Support device 500 includes optical drive 512 so as to allow a program stored, in a non-transitory manner, in a computer-readable storage medium 514 (for example, an optical storage medium such as a digital versatile disc (DVD)) to be read and installed in storage 510 or the like.

Support program 5104 or the like executed on support device 500 may be installed via computer-readable storage medium 514, or may be downloaded from a server device or the like on a network and then installed. Functions provided by support device 500 according to the present embodiment may be implemented via some of the modules provided by the OS.

Not that support device 500 may be removed from standard controller 100 while control system 1 is in operation.

b6: Other Embodiments

FIGS. 2 to 6 illustrate the configuration examples where one or more processors execute a program to provide necessary functions, but some or all of the functions thus provided may be implemented by a dedicated hardware circuit (for example, an application specific integrated circuit (ASIC), a field-programmable gate array (FPGA), or the like).

Further, core parts of standard controller 100, safety controller 200, and safety slave coupler 300 may be each implemented by hardware (for example, an industrial personal computer based on a general-purpose personal computer) adhering to a standard architecture. Further, a plurality of OSs having different uses may be executed in parallel using a virtualization technology, and a necessary application may be executed on each OS. Furthermore, a configuration where functions such as the display device and support device 500 are integrated into standard controller 100 may be employed.

C. Troubleshooting

Next, troubleshooting when an abnormality occurs in the user program running on the controller will be described.

The user (maintenance worker) connects support device 500 to a target controller installed in a manufacturing site, and starts to monitor the user program running on the controller.

For example, a function block in which a specific output variable (for example, a variable name "Error") has a value (for example, "TRUE") indicating that an error has occurred is identified from the function blocks included in the user program. After the function block in which the error has occurred is identified, a factor that has caused the error is identified on the basis of an input variable connected to the function block.

Alternatively, a function block whose output is off is identified from the function blocks included in the user program. Herein, "output is off" means a state in which a function block of interest outputs a value different from a value to be output in a normal state. In this case, a function block in which an output variable indicating an output signal has a value indicating an abnormal output (for example, "FALSE", "INACTIVE", or the like) is identified. After the function block whose output is off is identified, necessary processing is executed with reference to the state of the safety device or the like related to the function block, so as to recover from the abnormal state.

Next, an example of a state when an abnormality occurs in the user program running on the controller will be described.

Figure 7:
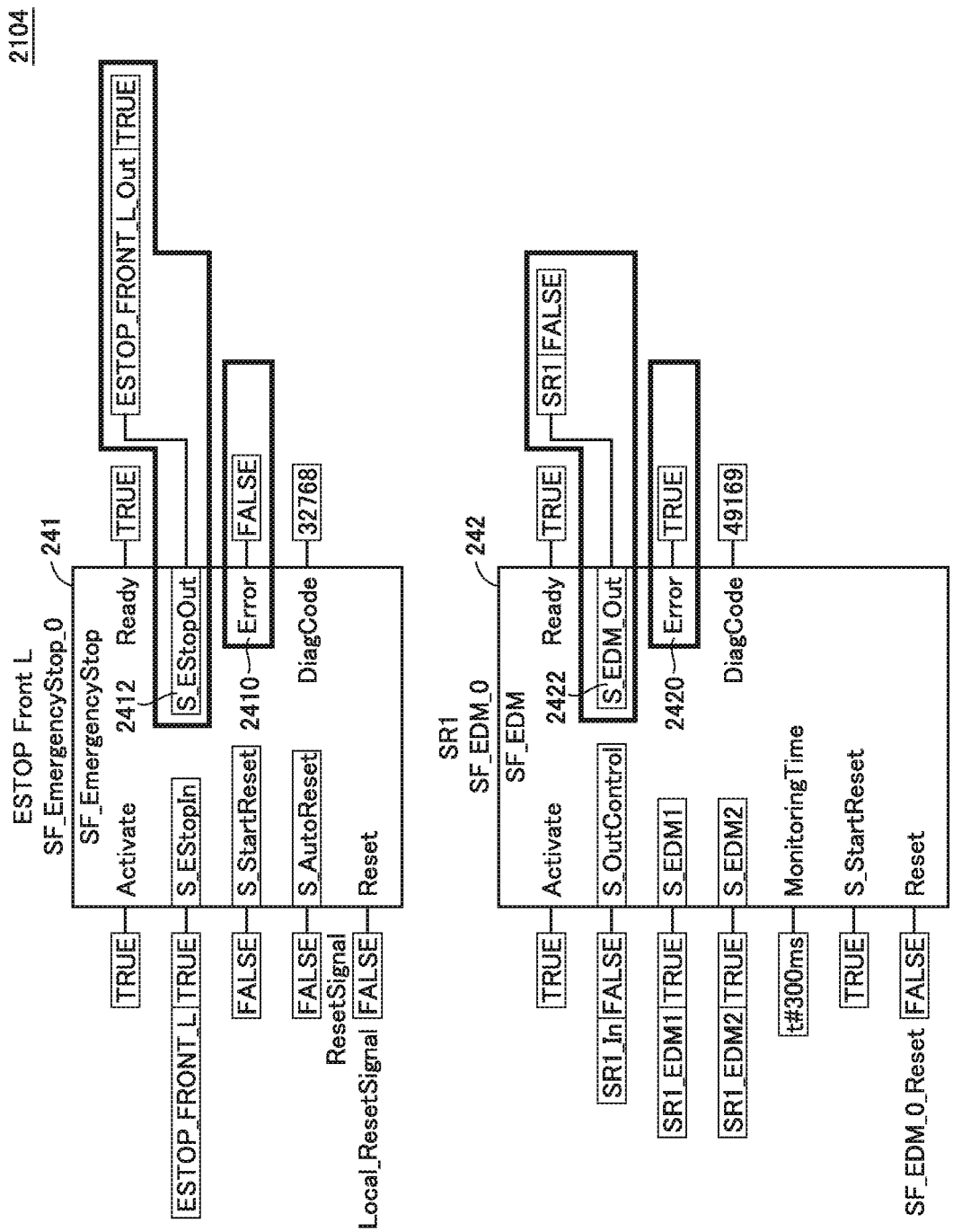
FIG. 7 is a diagram schematically illustrating an example of a state of a user program when an abnormality occurs in the control system according to the present embodiment.

FIG. 7 is a diagram schematically illustrating an example of a state of the user program when an abnormality occurs in control system 1 according to the present embodiment.

With reference to FIG. 7, safety program 2104 (running on safety controller 200) as an example of the user program includes two function block instances 241, 242.

Instance 241 corresponds to a function block of "SF_EmergencyStop" (emergency stop), and instance 242 corresponds to a function block of "SF_EDM" (monitoring of an external device).

FIG. 7 illustrates an example where processing handled by instance 241 is running normally, and an error has occurred in processing handled by instance 242. More specifically, in instance 241, an output variable 2410 having a variable name of "Error" has "FALSE", whereas in instance 242, an output variable 2420 having a variable name of "Error" has "TRUE".

Further, in a manner that depends on whether an error has occurred, the output of instance 241 illustrated in FIG. 7 is normal (output-on), and the output of instance 242 illustrated in FIG. 7 is off. More specifically, in instance 241, an output variable 2412 having a variable name of "S_EStopOut" has "TRUE", whereas in instance 242, an output variable 2422 having a variable name of "S_EDM_Out" has "FALSE". That is, for the function block of "SF_EmergencyStop", when the output variable having a variable name of "S_EStopOut" has "TRUE", the output variable indicates normal output, and for the function block of "SF_EDM", when the output variable having a variable name of "S_EDM_Out" has "TRUE", the output variable indicates normal output.

Figure 8:
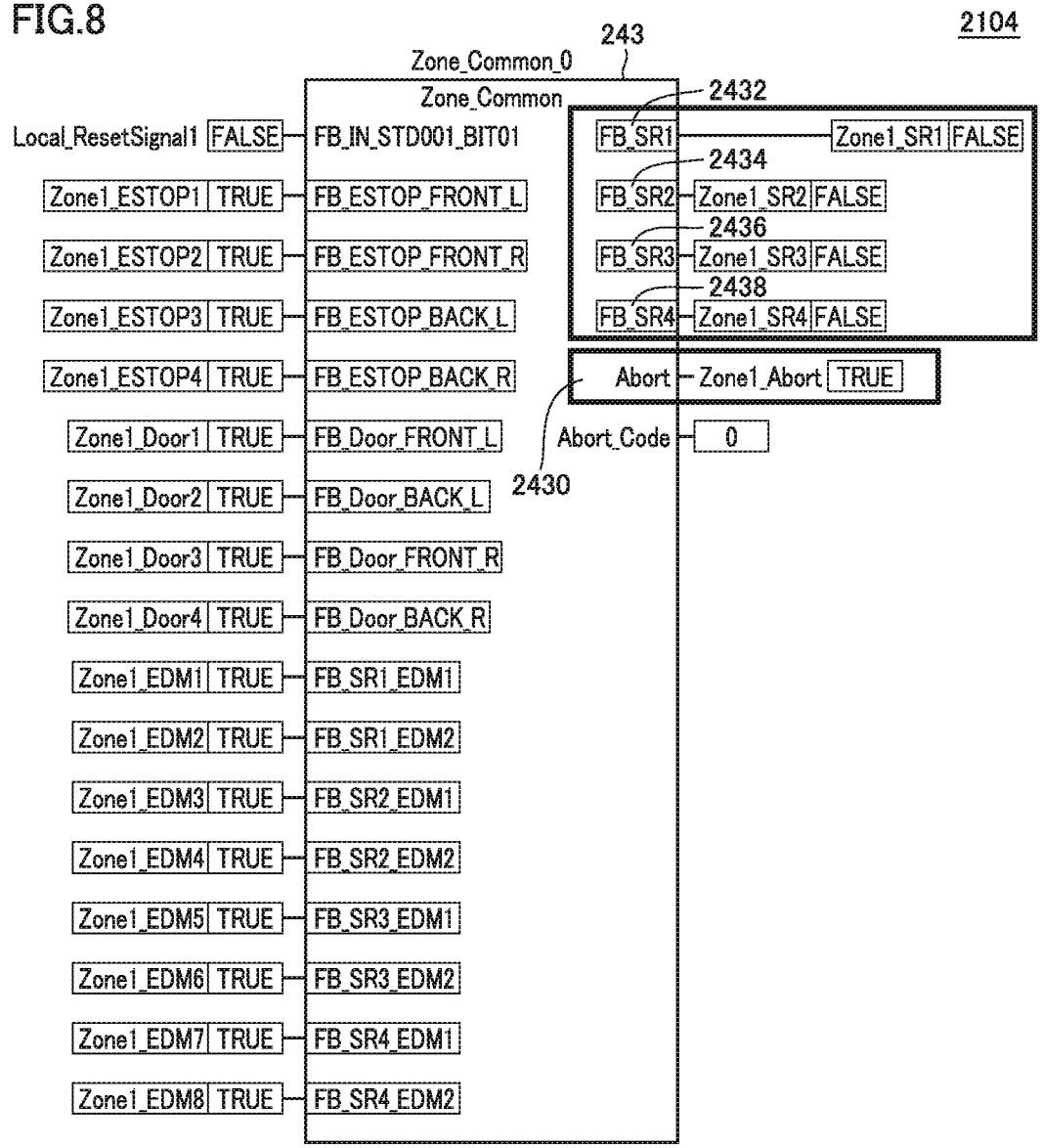
FIG. 8 is a diagram schematically illustrating another example of the state of the user program when an abnormality occurs in the control system according to the present embodiment.

FIG. 8 is a diagram schematically illustrating another example of the state of the user program when an abnormality occurs in control system 1 according to the present embodiment.

Safety program 2104 (running on safety controller 200) illustrated in FIG. 8 includes an instance 243 of a user-defined function block. An error has occurred in processing handled by instance 243, and an output variable 2430 having a variable name of "Abort" has "TRUE".

Further, in response to the occurrence of the error, the output of instance 243 illustrated in FIG. 8 becomes off. More specifically, in instance 243, an output variable 2432 having a variable name of "FB_SR1", an output variable 2434 having a variable name of "FB_SR2", an output variable 2436 having a variable name of "FB_SR3", and an output variable 2438 having a variable name of "FB_SR4" all have "FALSE". Output variables 2432, 2434, 2436, 2438 all having "TRUE" indicate normal output.

For example, when some error occurs, it is necessary to identify a function block instance in which the error has occurred. FIG. 7 illustrates instances corresponding to function blocks of two data types, but a plurality of instances corresponding to function blocks of the same data type are often included.

Therefore, in order to identify an instance in which an error has occurred, it is necessary to search for an instance in which the output variable having a variable name of "Error" has "TRUE" for the function block of "SF_EmergencyStop". For the function block of "SF_EDM", it is necessary to search for an instance in which the output variable having a variable name of "Error" has "TRUE".

Data types (such as "SF_EmergencyStop" and "SF_EDM") of function blocks and variable names to be used are often predefined in an international standard or the like. Note that a variable name (output variable name) related to the occurrence of an error and/or an operation state is not uniquely defined for the user-defined function block as illustrated in FIG. 8, so that it is necessary to check a target instance on condition that a variable name to be checked is already known. Further, the user-defined function block may have a plurality of target variables rather than one target variable.

In order to search for an instance in which an error has occurred, an instance whose output is off, or an instance that meets any condition, control system 1 according to the present embodiment prepares a mechanism for defining in advance a monitoring target variable name with the monitoring target variable name associated with a data type of a function block. Control system 1 searches for an instance of interest by determining whether a variable having a predefined target variable name indicates a condition value for each instance included in the user program. Note that a value taken by the monitoring target variable name may be further added as a condition.

D. Instance Search

Next, processing of searching for an instance in the user program in control system 1 according to the present embodiment will be described.

FIGS. 9A to 9C are diagrams schematically illustrating a configuration for implementing processing related to instance search of control system 1 according to the present embodiment. FIGS. 9A to 9C illustrate an example where safety program 2104 running on safety controller 200 set as a monitoring target, or alternatively, standard control program 1104 running on standard controller 100 may be set as a monitoring target.

With reference to FIGS. 9A to 9C, control system 1 includes a search module 550, and a display module 560 as main functional components for implementing the processing related to instance search.

Search module 550 searches for an instance that meets monitoring condition 570 among one or more instances of one or more function blocks included in the running user program. In monitoring condition 570, a data type of a function block and a monitoring target variable name are defined with the data type and the monitoring target variable name associated with each other.

More specifically, search module 550 searches for, among one or more instances of one or more function blocks created for safety controller 200 (controller) to execute safety program 2104 (user program), an instance having a data type matching a data type defined in monitoring condition 570 and having a value of a monitoring target variable associated with the data type indicating a monitoring target event. Then, search module 550 adds the instance thus retrieved to a search result.

Note that the value indicating the monitoring target event associated with the name of the monitoring target variable may be predetermined with the value associated with a corresponding monitoring condition. For example, for monitoring condition 570 used for monitoring the occurrence of an error, "TRUE" may be preset as a value indicating a monitoring target, and for monitoring condition 570 used for monitoring output-off, "FALSE" may be preset as a value indicating a monitoring target.

Further, search module 550 may provide a user interface related to creation and update of monitoring condition 570.

Display module 560 outputs a list of one or more instances retrieved by search module 550. The search result includes a POU name and an instance name for navigating to a target portion in the running user program.

FIG. 9A illustrates a configuration example where search module 550 and display module 560 are installed in support device 500. Support device 500 is connected to safety controller 200 via standard controller 100 (not illustrated). In response to a user operation, search module 550 of support device 500 refers to safety program 2104 executed on safety controller 200 to search for an instance that meets monitoring condition 570.

FIG. 9B illustrates a configuration example where search module 550 is installed in safety controller 200, and display module 560 is installed in support device 500. In response to a user operation, search module 550 of safety controller 200 refers to safety program 2104 to search for an instance that meets monitoring condition 570. The search result from search module 550 is provided to display module 560 of support device 500 via standard controller 100 (not illustrated).

FIG. 9C illustrates a configuration example where search module 550 and display module 560 are installed in safety controller 200. In response to a user operation, search module 550 of safety controller 200 refers to safety program 2104 to search for an instance that meets monitoring condition 570. The search result from search module 550 is provided to output unit 508 of support device 500 via standard controller 100 (not illustrated).

Figure 10:
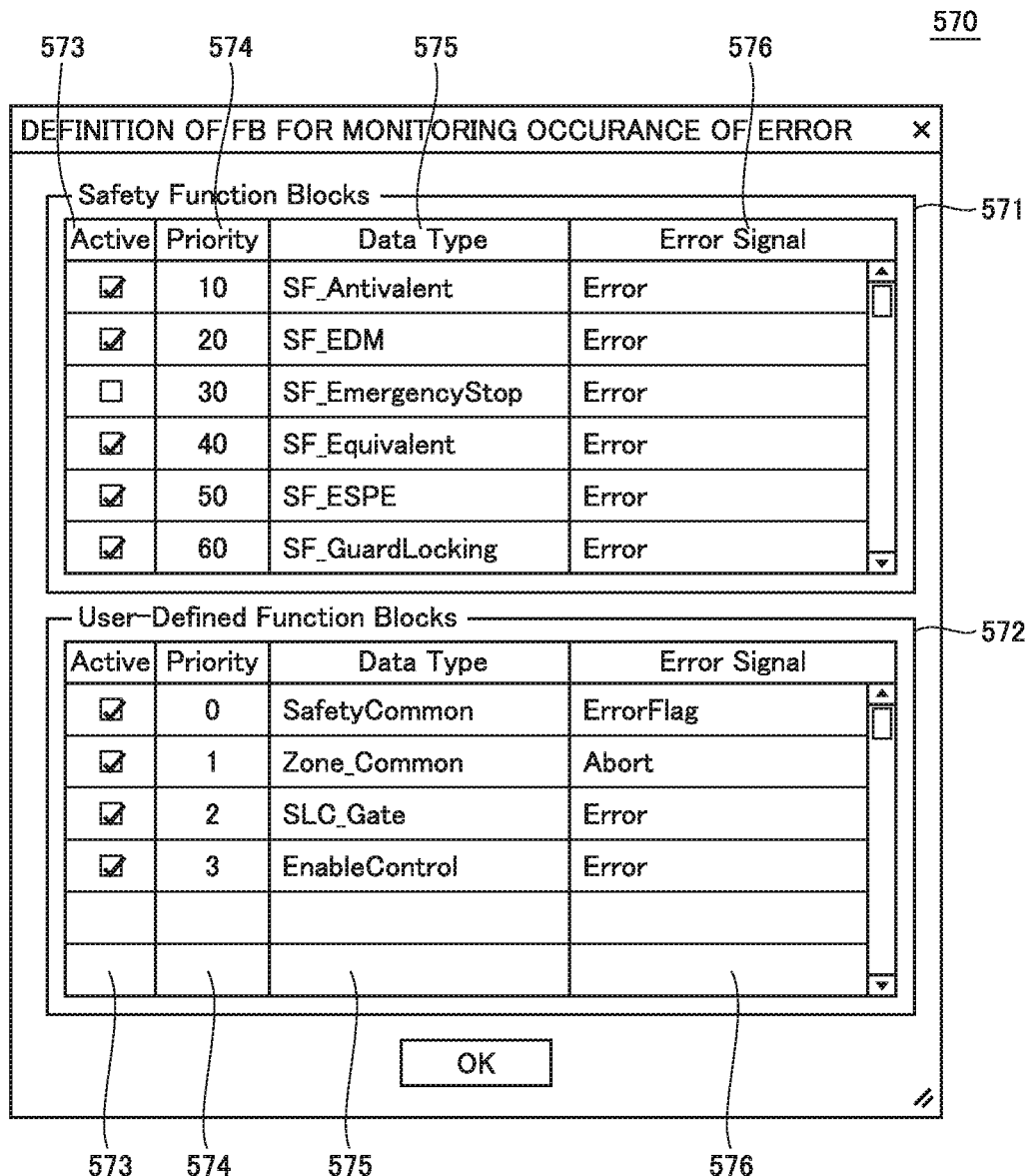
FIG. 10 is a diagram schematically illustrating an example of a monitoring condition used for monitoring the occurrence of an error in the control system according to the present embodiment.
Figure 11:
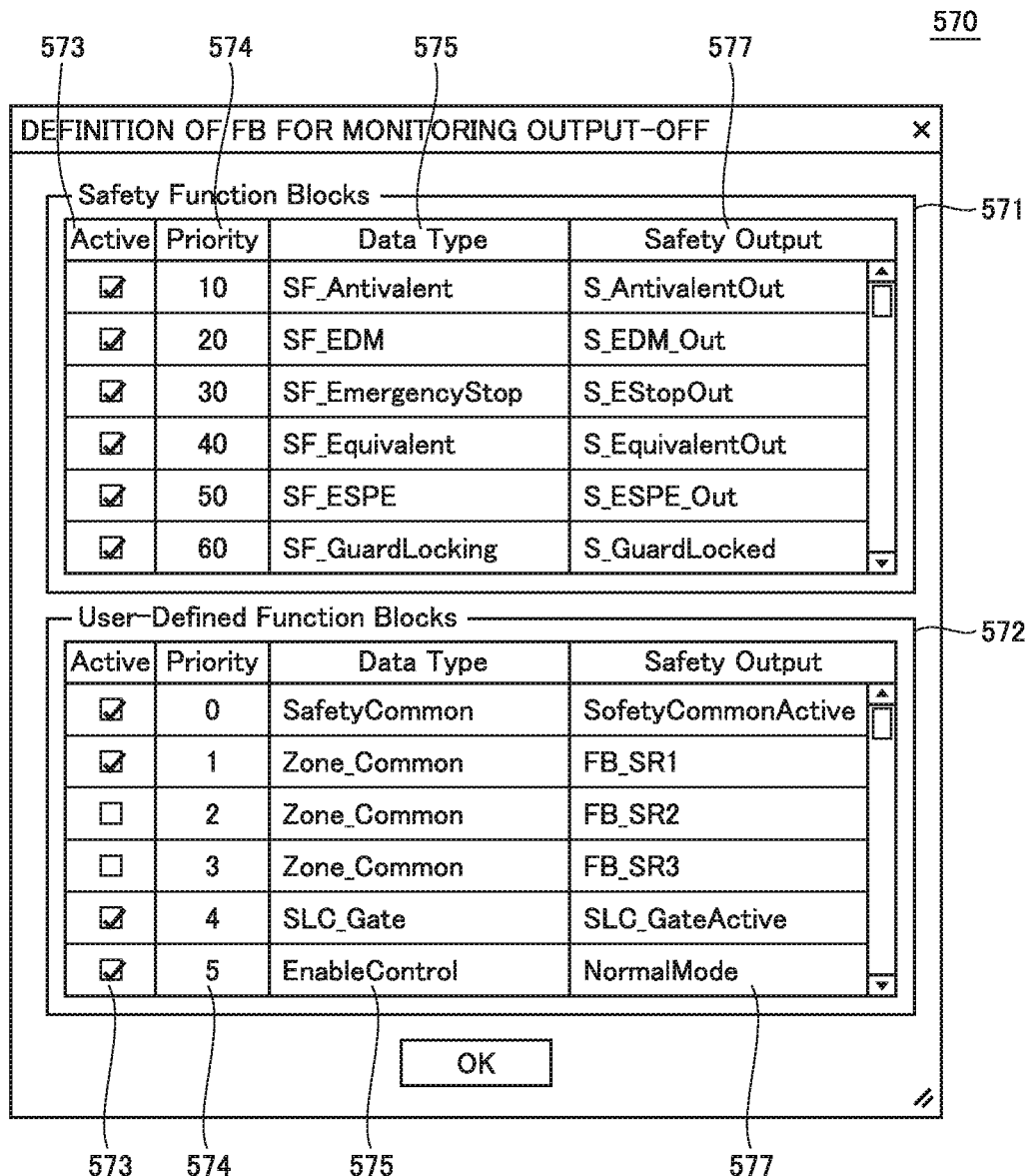
FIG. 11 is a diagram schematically illustrating an example of a monitoring condition used for monitoring output-off in the control system according to the present embodiment.

FIG. 10 is a diagram schematically illustrating an example of monitoring condition 570 used for monitoring the occurrence of an error in control system 1 according to the present embodiment. FIG. 11 is a diagram schematically illustrating an example of a monitoring condition 570 used for monitoring output-off in control system 1 according to the present embodiment.

Monitoring condition 570 used for monitoring the occurrence of an error is a condition used for monitoring whether an error has occurred in a function block. Monitoring condition 570 used for monitoring output-off is a condition used for monitoring whether the output of a function block is off. At least one of such monitoring conditions 570 may be prepared, or a completely different monitoring condition 570 may be prepared.

With reference to FIG. 10, monitoring condition 570 used for monitoring the occurrence of an error includes a definition in which a data type of a monitoring target function block is associated with an output variable used for determining the occurrence of an error. As an example, monitoring condition 570 used for monitoring the occurrence of an error includes a standard function block condition 571 and a user-defined function block condition 572.

Standard function block condition 571 includes a condition for a function block prepared in advance. The function block prepared in advance may be defined in accordance with an international standard or the like, or may be defined uniquely by a manufacturer.

User-defined function block condition 572 includes a condition for a user-defined function block. For example, even when it is not desired to disclose an internal logic for security reasons or the like (for example, in a protected state), the output variable of an instance of a function block can be monitored. Therefore, when the condition for the user-defined function block can be set, it is possible to search for an instance of the user-defined function block in which an error has occurred.

Standard function block condition 571 and user-defined function block condition 572 each include an activation flag 573, a priority 574, a data type 575, and an error signal 576 as setting items.

Activation flag 573 defines whether the function block in a corresponding row is set as a monitoring target. More specifically, when activation flag 573 is checked, the function block in the corresponding row is set as a monitoring target.

Priority 574 defines a search order of the function block in a corresponding row. Monitoring condition 570 may include priority 574 for each data type. The instances of function blocks are sequentially searched in the order based on the values of priority 574. In the example illustrated in FIG. 10, the lower the value, the higher the priority. Therefore, the instances of function blocks are displayed in ascending order of the values of priority 574. That is, display module 560 may display the retrieved instances in the order based on priority 574 defined in monitoring condition 570.

Data type 575 defines a data type of a monitoring target function block. A data type of a function block prepared in advance is set as data type 575 of standard function block condition 571. A data type of a function block created as desired by the user is set as data type 575 of user-defined function block condition 572.

Error signal 576 defines a name of a variable used for monitoring the occurrence of an error among one or more variables set to the function block in a corresponding row. Note that, for monitoring the occurrence of an error, a value indicating a monitoring target is "TRUE". That is, when the variable set to error signal 576 has "TRUE", the variable indicates that an error has occurred. That is, an instance in which the variable set to error signal 576 has "TRUE" is extracted.

With reference to FIG. 11, monitoring condition 570 used for monitoring output-off includes a definition in which a data type of a monitoring target function block is associated with an output variable used for determining output-off. Monitoring condition 570 used for monitoring output-off illustrated in FIG. 11 is substantially the same as monitoring condition 570 used for monitoring the occurrence of an error (see FIG. 10) except that a safety output 577 is used instead of error signal 576. That is, monitoring condition 570 used for monitoring output-off also includes standard function block condition 571 and user-defined function block condition 572.

Safety output 577 defines a name of a variable used for monitoring output-off among one or more variables set to the function block in a corresponding row. Note that the user-defined function block often handles a plurality of output signals, so that a plurality of safety outputs 577 may be set to the same function block.

Note that, for monitoring output-off, a value indicating a monitoring target is "FALSE". That is, when the variable set to safety output 577 has "FALSE", the variable indicates that output is off. That is, the instance in which the variable set to safety output 577 has "FALSE" is extracted.

Note that, for standard function block condition 571 of monitoring condition 570 (FIG. 10) used for monitoring the occurrence of an error and standard function block condition 571 of monitoring condition 570 (FIG. 11) used for monitoring output-off, the condition for a function block prepared in advance is set, so that a correspondence between data type 575 and error signal 576 and/or a correspondence between data type 575 and safety output 577 may be unchangeable by the user.

FIG. 12 is a diagram schematically illustrating an example of a common monitoring condition 570 used in control system 1 according to the present embodiment. With reference to FIG. 12, a common monitoring condition 570 includes standard function block condition 571 and user-defined function block condition 572.

Standard function block condition 571 and user-defined function block condition 572 each include an activation flag 573, a priority 574, a data type 575, a monitoring signal 578, and a set value 579 as setting items.

Activation flag 573, priority 574, and data type 575 are the same as in monitoring condition 570 illustrated in FIGS. 10 and 11.

Monitoring signal 578 defines a name of a variable used for monitoring a target among one or more variables set to the function block in a corresponding row.

Set value 579 defines a value indicating a monitoring target event associated with a name of a monitoring target variable. That is, a condition for the value taken by the variable in a corresponding row is defined. That is, when the target variable has the set value (for example, "TRUE"), the target instance is extracted as an instance that meets the condition.

As illustrated in FIG. 12, as monitoring condition 570, a set of a name of a monitoring target variable and a value taken by the monitoring target variable is defined for each data type of a function block, so that it is possible to monitor both the occurrence of an error and output-off under a single monitoring condition 570 and to freely set any desired monitoring condition.

FIG. 13 is a diagram schematically illustrating an example of a standard function block definition in control system 1 according to the present embodiment. FIG. 13 illustrates examples of default set values of data type 575 (FIGS. 10 to 12), error signal 576 (FIG. 10), and safety output 577 (FIG. 11) for (22) data types of function blocks defined in the above "PLCopen-Technical Committee 5-Safety, Software Technical Specification Part 1: Concepts and Function Blocks Version 2.01—Official Release."

That is, the value of "data type of function block" in FIG. 13 is set as the value of data type 575. The value of "output variable used for monitoring the occurrence of an error" in FIG. 13 is set as the value of error signal 576. The value of "output variable used for monitoring output-off" in FIG. 13 is set as the value of safety output 577. In terms of operation, a function block that is desired to be removed from the monitoring target can be removed from monitoring condition 570.

Figure 14:
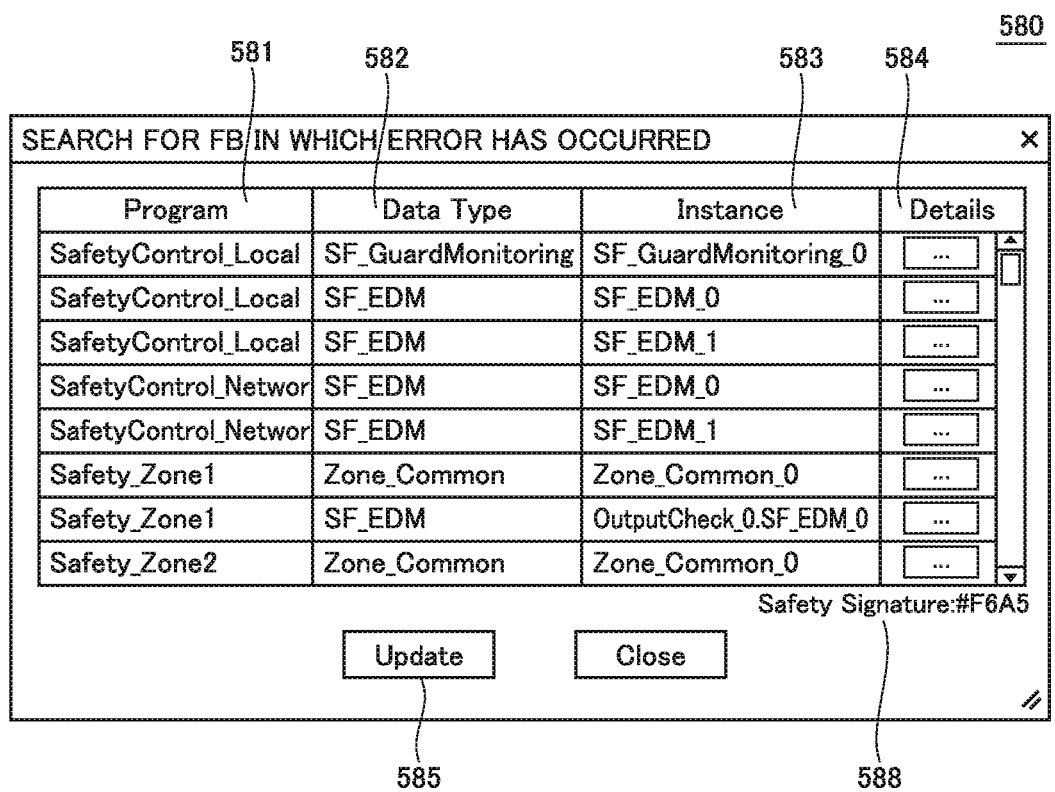
FIG. 14 is a diagram schematically illustrating an example of a search result from the control system according to the present embodiment.

FIG. 14 is a diagram schematically illustrating an example of a search result from control system 1 according to the present embodiment. Searching for an instance of a function block that meets the condition in accordance with priority 574 set in monitoring condition 570 generates a search result 580 as illustrated in FIG. 14.

More specifically, search result 580 includes a program name 581, a data type 582, an instance name 583, and a detail button 584.

Program name 581 is a name of a program including the retrieved instance. Data type 582 is a data type of the retrieved function block. Instance name 583 is a name of the retrieved instance.

When monitoring condition 570 (FIG. 10) used for monitoring the occurrence of an error is used, instances of function blocks in which an error has occurred are listed in search result 580. On the other hand, when monitoring condition 570 used for monitoring output-off (FIG. 11) is used, instances of function blocks whose outputs are off are listed in search result 580.

When any detail button 584 is selected, a portion of the user program in which the retrieved instance exists is displayed. That is, display module 560 displays the portion of the user program in which the function block corresponding to the instance selected from among the retrieved instances exists. Alternatively, with the user program displayed, the user program may jump to the portion where the retrieved instance exists.

When an update button 585 is selected, the search processing is executed again. Even when update button 585 is not selected, the search processing may be repeatedly executed at predetermined time intervals.

When the monitoring target is safety program 2104, a signature code 588 may be output in addition to the search result.

FIGS. 15A and 15B are diagrams schematically illustrating another example of the search result from control system 1 according to the present embodiment. FIG. 15A illustrates an example of a search result 580A using monitoring condition 570 for monitoring the occurrence of an error, and FIG. 15B illustrates an example of a search result 580B using monitoring condition 570 for monitoring output-off.

Search result 580A further includes a diagnostic code 586 and a status name 587 as compared with search result 580 (FIG. 14). As diagnostic code 586, a value of a diagnostic code, which is one of the output variables of the retrieved instance, is output. As status name 587, a status name of the state transition diagram indicated by a corresponding diagnostic code is output. The status name thus output is typically defined in an international standard or the like.

As with search result 580A, search result 580B further includes a diagnostic code 586 and a status name 587 as compared with search result 580 (FIG. 14). Values output as diagnostic code 586 and status name 587 correspond to output-off.

As described above, display module 560 may further display at least one of diagnostic code 586 output from the retrieved instance and status name 587 of the state transition diagram indicated by diagnostic code 586.

Note that the output is off in both a case where an error has occurred and a case where the target safety device has executed an interruption operation (normal operation), but the search can be executed in both the cases for search result 580B illustrated in FIG. 15B.

Furthermore, any instance may be selected from among the instances listed in FIG. 15A and/or FIG. 15B, and the user may execute a specific operation to display a manual or a help screen for the instance thus selected.

As described above, the user can easily check a list of one or more instances (function blocks) in which an error has occurred in the user program by acquiring search result 580 using monitoring condition 570 for monitoring the occurrence of error (FIG. 10). Then, the user can move to the target portion in the user program to check a related logic more easily and identify the factor of the abnormality more easily by selecting detail button 584 corresponding to the instance (function block) of interest.

Likewise, the user can easily check a list of one or more instances (function blocks) whose outputs are off in the user program by acquiring search result 580 using monitoring condition 570 for monitoring output-off (FIG. 11). Then, the user can move to the target portion in the user program to check a related logic more easily and identify the factor of the abnormality more easily by selecting detail button 584 corresponding to the instance (function block) of interest.

E. Processing Procedure

Figure 16:
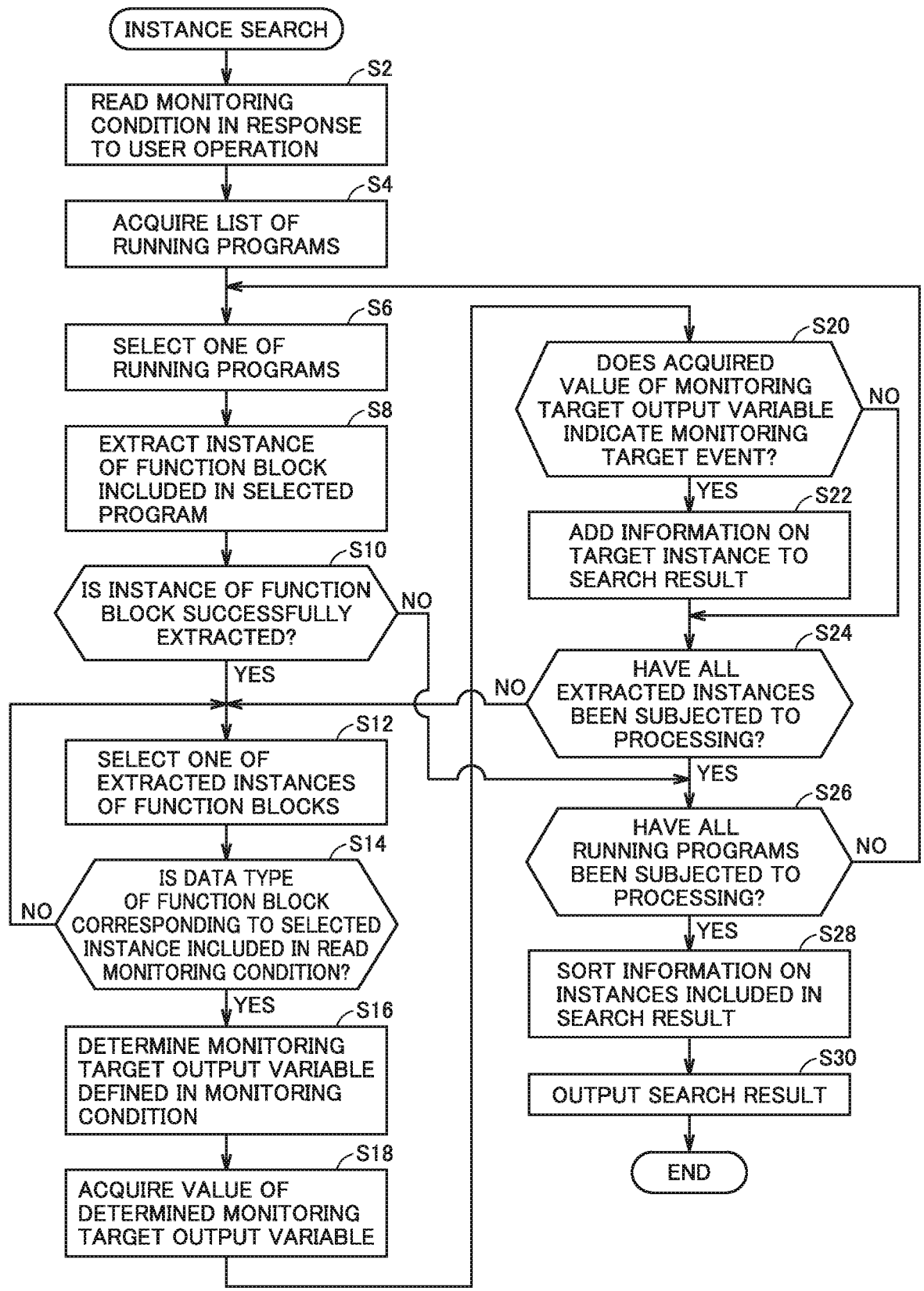
FIG. 16 is a flowchart illustrating a processing procedure related to instance search of the control system according to the present embodiment.

FIG. 16 is a flowchart illustrating a processing procedure related to instance search of control system 1 according to the present embodiment. Typically, processor 502 of support device 500 runs support program 5104 to execute each step illustrated in FIG. 16 (see FIG. 9A). Note that at least some of the steps illustrated in FIG. 16 may be executed by safety controller 200 and/or standard controller 100.

With reference to FIG. 16, support device 500 reads monitoring condition 570 in response to a user operation (step S2). For example, either monitoring condition 570 used for monitoring the occurrence of an error or monitoring condition 570 used for monitoring output-off may be selected. At this time, a predetermined value indicating a monitoring target event may be set in accordance with monitoring condition 570 thus selected.

Support device 500 accesses a controller of the monitoring target to acquire a list of one or more running programs (user programs) (step S4). That is, support device 500 executes processing of connecting to the controller that runs the user program. Then, the search processing is started.

Support device 500 selects one of the running programs with reference to the list acquired in step S4 (step S6), and extracts an instance of a function block included in the program thus selected (step S8). When the selected program has no instance of a function block (NO in step S10), steps S12 to S24 are skipped.

Support device 500 selects one of the extracted instances of the function blocks (step S12), and determines whether the data type of the function block corresponding to the selected instance is included in read monitoring condition 570 (step S14).

When the data type of the function block corresponding to the selected instance is not included in read monitoring condition 570 (NO in step S14), step S12 and the subsequent steps are repeated.

When the data type of the function block corresponding to the selected instance is included in read monitoring condition 570 (YES in step S14), support device 500 determines a monitoring target output variable defined in monitoring condition 570 (step S16), and acquires the value of the monitoring target output variable thus determined (step S18). Then, support device 500 determines whether the value of the monitoring target output variable thus acquired indicates the monitoring target event (step S20).

When the value of the monitoring target output variable indicates the monitoring target event (YES in step S20), support device 500 adds information on the target instance to the search result (step S22). On the other hand, when the value of the monitoring target output variable does not indicate the monitoring target event (NO in step S20), step S22 is skipped.

Support device 500 determines whether the processing has been executed on all the extracted instances (step S24). When the processing has not been executed on all the extracted instances (NO in step S24), step S12 and the subsequent steps are repeated.

When the processing has been executed on all the extracted instances (YES in step S24), support device 500 determines whether the processing has been executed on all the running programs (step S26). When the processing has not been executed on all the running programs (NO in step S26), step S6 and the subsequent steps are repeated.

When the processing has been executed on all the running programs (YES in step S26), support device 500 sorts the information on the instances included in the search result in accordance with the priority based on the data type of a corresponding function block set in monitoring condition 570 (step S28). Support device 500 outputs the search result after the sort (step S30). Then, the processing is brought to an end.

Note that when update button 585 (FIGS. 14, 15A, and 15B) is selected, step S4 and the subsequent steps are repeatedly executed. Note that even when update button 585 is not selected, step S4 and the subsequent steps may be repeatedly executed at predetermined time intervals.

In the extraction of a monitoring target function block (step S8), when a user-defined function block is extracted, and the user-defined function block thus extracted is not protected, steps S8 to S24 may be recursively executed on the user-defined function block.

F. Modification

In FIG. 1 illustrating control system 1, a configuration example where support device 500 is connected to standard controller 100 to access safety controller 200 via standard controller 100 has been given. Alternatively, support device 500 may be connected to safety controller 200 to directly access safety controller 200.

Note that the search processing according to the present embodiment is also applicable to standard control program 1104 executed on standard controller 100. In this case, support device 500 may be connected to target standard controller 100 to directly access target standard controller 100. Alternatively, support device 500 may be connected to a different standard controller 100 to access target standard controller 100 via different standard controller 100.

Further, some or all of the functions necessary for the search processing according to the present embodiment may be implemented in a display device such as an HMI or a PT instead of support device 500. In this case, the display device such as an HMI or a PT serves as support device 500.

G. Advantages

Control system 1 according to the present embodiment extracts an instance of a function block included in a user program, and when the instance thus extracted corresponds to a function block of a predesignated data type, and an output variable having a predesignated variable name of the instance has a predesignated value, the instance is determined to be a target instance. The use of such a monitoring condition in which the data type and the variable name are associated with each other makes it possible to perform troubleshooting of an abnormality that occurs during execution of the user program.

Although the present invention has been described and illustrated in detail, it is clearly understood that the same is by way of illustration and example only and is not to be taken by way of limitation, the scope of the present invention being interpreted by the terms of the appended claims.

What is claimed is:
1. A support device comprising:
   a universal serial bus (USB) controller that establishes a connection to a controller, the controller being configured to execute a user program written using one or more function blocks, the user program, when running on the controller, including one or more instances of the one or more functional blocks created for the controller to execute the user program, each instance of the one or more instances having an instance name;

a storage that stores one or more programs, and a monitoring condition defining a data type of a function block and a name of a monitoring target variable that is associated with the data type; and a processor that accesses the storage and executes the one or more programs to cause the processor to function as a search module that searches for, among the one or more instances, one or more matching instances having a data type of a corresponding function block that matches the data type defined in the monitoring condition and having a value of the monitoring target variable indicating a monitoring target event.

2. The support device according to claim 1, further comprising:

a display, wherein the processor executes the one or more programs to cause the processor to display, on the display, a list of the one or more matching instances.

3. The support device according to claim 2, wherein the processor executes the one or more programs to cause the processor to display, on the display, a portion of the user program that includes the corresponding function block that corresponds to an instance selected from among the list of the one or more matching instances that are displayed.

4. The support device according to claim 2, wherein the processor executes the one or more programs to cause the processor to display, on the display, at least one of a diagnostic code output from each of the one or more matching instances and a status name of a state transition diagram indicated by the diagnostic code.

5. The support device according to claim 2, wherein:

the monitoring condition includes a plurality of data types and, for each data type, a priority; and the processor executes the one or more programs to cause the processor to display, on the display, the one or more matching instances in an order based on the priorities.

6. The support device according to claim 1, wherein the value of the monitoring target variable is further defined in the monitoring condition.

7. The support device according to claim 1, wherein the monitoring condition includes a set value indicating the monitoring target event that is associated with the name of the monitoring target variable.

8. The support device according to claim 1, wherein the monitoring condition includes at least one of a condition used for monitoring an occurrence of a function block error and a condition used for monitoring an output-off function block whose output is off.

9. The support device according to claim 1, wherein the user program is a safety program.

10. A non-transitory storage medium storing a support program for implementing a support device, the support program causing one or more processors to perform:

reading a monitoring condition that defines a data type of a function block and a name of a monitoring target variable that is associated with the data type;

establishing a connection to a controller configured to execute a user program written using one or more function blocks, the user program, when running on the controller, including one or more instances of the one or more functional blocks created for the controller to execute the user program, each instance having an instance name; and searching for, among the one or more instances, one or more matching instances having a data type of a corresponding functional block that matches the data type defined in the monitoring condition and having a value of the monitoring target variable indicating a monitoring target event.

11. The non-transitory storage medium according to claim 10, wherein the support program further causes the one or more processors to perform displaying a list of the one or more matching instances.

12. The non-transitory storage medium according to claim 11, wherein the displaying includes displaying a portion of the user program that includes the corresponding function block that corresponds to an instance selected from among the list of the one or more matching instances that are displayed.

13. The non-transitory storage medium according to claim 11, wherein the displaying includes displaying at least one of a diagnostic code output from each of the one or more matching instances and a status name of a state transition diagram indicated by the diagnostic code.

14. The non-transitory storage medium according to claim 11, wherein:

the monitoring condition includes a plurality of data types and, for each data type, a priority, and the displaying includes displaying the one or more matching instances in an order based on the priorities.

15. The non-transitory storage medium according to claim 10, wherein the value of the monitoring target variable is further defined in the monitoring condition.

16. A control system comprising:

a controller that executes a user program written using one or more function blocks, the user program, when running on the controller, including one or more instances of the one or more functional blocks created for the controller to execute the user program, each instance having an instance name;

a storage that stores one or more programs, and a monitoring condition that defines a data type of a function block and a name of a monitoring target variable that is associated with the data type; and a processor that accesses the storage and executes the one or more programs to cause the processor to function as a search module that searches for, among the one or more instances, one or more matching instances having a data type of a corresponding functional block that matches the data type defined in the monitoring condition and having a value of the monitoring target variable indicating a monitoring target event.

17. The control system according to claim 16, further comprising:

a display;

wherein the processor executes the one or more programs to cause the processor to display, on the display, a list of the one or more matching instances.

18. The control system according to claim 17, wherein the processor executes the one or more programs to cause the processor to display, on the display, a portion of the user program that includes the corresponding function block that corresponds to an instance selected from among the list of the one or more matching instances that are displayed.

19. The control system according to claim 17, wherein the processor executes the one or more programs to cause the processor to display, on the display, at least one of a diagnostic code output from each of the one or more matching instances and a status name of a state transition diagram indicated by the diagnostic code.

20. The control system according to claim 17, wherein:
the monitoring condition includes a plurality of data types and, for each data type, a priority, and
the processor executes the one or more programs to cause the processor to display the one or more matching instances in an order based on the priorities.

\* \* \* \* \*